US012772974B1

(12) United States Patent
Kittredge, Jr.

(10) Patent No.: US 12,772,974 B1
(45) Date of Patent: Oct. 27, 2026

(54) BIRD DECOY OPERATING SYSTEM

(71) Applicant: John Williamson Kittredge, Jr., Greenville, SC (US)

(72) Inventor: John Williamson Kittredge, Jr., Greenville, SC (US)

(73) Assignee: Duck Rigger, LLC, Greenville, SC (US)

( * ) Notice: Subject to any disclaimer, the term of this patent is extended or adjusted under 35 U.S.C. 154(b) by 0 days.

(21) Appl. No.: 19/288,272

(22) Filed: Aug. 1, 2025

(51) Int. Cl.
*A01M 31/06* (2006.01)

(52) U.S. Cl.
CPC .................................. *A01M 31/06* (2013.01)

(58) Field of Classification Search
CPC .................................................... A01M 31/06
USPC ........................................................... 43/2, 3
See application file for complete search history.

(56) References Cited

U.S. PATENT DOCUMENTS 740,293 A * 9/1903 Loeble .................. A01M 31/06 43/3
1,831,286 A * 11/1931 Chelini ................. A01M 31/06 43/3
2,129,781 A * 9/1938 Park ...................... A01M 31/06 43/3
2,174,211 A * 9/1939 Hutaff, Jr. ............. A01M 31/06 43/3
2,595,966 A * 5/1952 Majors .................... B63B 21/32 43/3
4,141,167 A * 2/1979 Muehl ................... A01M 31/06 43/2
4,347,914 A * 9/1982 Gary ......................... A45F 3/26 182/7
4,535,560 A * 8/1985 O'Neil .................. A01M 31/06 43/3
4,599,819 A * 7/1986 Voges, Jr. ............. A01M 31/06 43/2
4,656,770 A * 4/1987 Nuttle ....................... H02G 7/00 446/178
4,910,905 A * 3/1990 Girdley ................. A01M 31/06 43/3
5,074,071 A * 12/1991 Dunne .................. A01M 31/06 43/2
5,168,649 A * 12/1992 Wright .................. A01M 31/06 43/2
5,459,958 A * 10/1995 Reinke .................. A01M 31/06 43/2

(Continued)

*Primary Examiner* — Morgan T Jordan
(74) *Attorney, Agent, or Firm* — Fox Rothschild LLP

(57) ABSTRACT

An apparatus for securing a jerk rig beneath a surface of a body of water includes a helical anchoring member configured to engage with an area of ground when rotated. The apparatus further includes a halyard support portion including an elongated shaft connected to (and extending upwards from) the helical anchoring member, the halyard support portion supporting one or more halyard systems. Each halyard system includes upper and lower pulleys (the upper pulley disposed further from the helical anchoring member than the lower pulley) and a halyard running between the pulleys. The halyard includes an attachment point for a jerk line, and the halyard is configured (when operated) to cause the attachment point to move between the upper and lower pulleys. The apparatus further includes at least one arm extending outwardly from the elongated shaft and defining a handle for rotating the helical anchoring member.

19 Claims, 5 Drawing Sheets

(56) References Cited

U.S. PATENT DOCUMENTS

| | | | | | |
|---|---|---|---|---|---|
| 5,974,720 | A * | 11/1999 | Bowling | A01M 31/06 | 43/2 |
| 6,035,968 | A * | 3/2000 | Morales | A01M 31/02 | 182/116 |
| 6,092,323 | A * | 7/2000 | McBride | A01M 31/06 | 43/3 |
| 6,138,396 | A * | 10/2000 | Capps | A01M 31/06 | 43/3 |
| 6,311,425 | B1 * | 11/2001 | Capps | A01M 31/06 | 43/3 |
| 6,349,497 | B1 * | 2/2002 | Roddenbery | A01M 31/06 | 43/2 |
| 6,374,529 | B1 * | 4/2002 | Petroski | A01M 31/06 | 43/3 |
| 6,430,863 | B1 * | 8/2002 | Krag | A01M 31/06 | 43/3 |
| 6,574,902 | B1 * | 6/2003 | Conger | A01M 31/06 | 43/2 |
| 6,698,132 | B1 * | 3/2004 | Brint | A01M 31/06 | 43/2 |
| 6,782,653 | B1 * | 8/2004 | Thomas | A01M 31/06 | 43/2 |
| 6,834,458 | B1 * | 12/2004 | Hand, III | A01M 31/06 | 43/2 |
| 7,043,865 | B1 * | 5/2006 | Crowe | A01M 31/06 | 43/3 |
| 7,131,230 | B1 * | 11/2006 | Gilsdorf | A01M 31/06 | 43/2 |
| 7,272,906 | B1 * | 9/2007 | Spaulding, Sr. | A01M 31/06 | 248/156 |
| 9,038,308 | B2 * | 5/2015 | Smith | A01M 31/06 | 43/2 |
| 9,814,229 | B1 * | 11/2017 | Flake, Jr. | A01M 31/06 | |
| 10,638,747 | B2 * | 5/2020 | Noe | G06F 13/385 | |
| 11,363,811 | B2 | 6/2022 | Mager | | |
| 11,589,573 | B1 | 2/2023 | Kennedy | | |
| 11,825,832 | B2 | 11/2023 | Beauchamp | | |
| 11,896,001 | B2 | 2/2024 | Springer, III | | |
| 12,089,586 | B2 | 9/2024 | Uptegrove et al. | | |
| 12,150,443 | B2 | 11/2024 | Wood et al. | | |
| 12,302,891 | B1 | 5/2025 | Noe et al. | | |
| 2002/0124453 | A1 * | 9/2002 | Payne | A01M 31/06 | 43/3 |
| 2003/0041500 | A1 * | 3/2003 | Thomas | A01M 31/06 | 43/2 |
| 2004/0045210 | A1 * | 3/2004 | Wright | A01M 31/06 | 43/3 |
| 2004/0250461 | A1 * | 12/2004 | Dryer | A01M 31/06 | 43/2 |
| 2007/0137092 | A1 * | 6/2007 | Butz | A01M 31/06 | 43/3 |
| 2008/0092427 | A1 * | 4/2008 | Brint | A01M 31/06 | 43/2 |
| 2009/0084018 | A1 * | 4/2009 | Elliott | A01M 31/06 | 43/3 |
| 2009/0094877 | A1 * | 4/2009 | Smith | A01M 31/06 | 43/3 |
| 2009/0165353 | A1 * | 7/2009 | Priest | A01M 31/06 | 43/2 |
| 2010/0071248 | A1 * | 3/2010 | Brestal | G08C 17/02 | 340/573.2 |
| 2012/0066951 | A1 * | 3/2012 | Luttrull | A01M 31/06 | 43/2 |
| 2012/0073180 | A1 * | 3/2012 | Elliott | A01M 31/06 | 43/3 |
| 2013/0104443 | A1 * | 5/2013 | Cramer | A01M 31/06 | 43/2 |
| 2013/0199076 | A1 * | 8/2013 | Dean | A01M 31/06 | 43/3 |
| 2013/0212924 | A1 * | 8/2013 | Shisko | A01M 31/06 | 248/176.1 |
| 2014/0331542 | A1 * | 11/2014 | Andrews | A01M 31/06 | 43/3 |
| 2014/0338248 | A1 * | 11/2014 | Leventini | A01M 31/06 | 43/2 |
| 2015/0027029 | A1 * | 1/2015 | Mager | A01M 31/06 | 43/2 |
| 2016/0174541 | A1 * | 6/2016 | Goodman | A01M 31/00 | 43/3 |
| 2016/0174542 | A1 * | 6/2016 | Burton | A01M 99/00 | 43/3 |
| 2016/0295853 | A1 * | 10/2016 | Evenson, III | A01M 29/06 | |
| 2016/0360869 | A1 * | 12/2016 | Brooks | F16M 11/041 | |
| 2018/0014530 | A1 | 1/2018 | Sturm | | |
| 2018/0192638 | A1 * | 7/2018 | Denmon | A01M 31/06 | |
| 2023/0123980 | A1 * | 4/2023 | Carmack | A01M 31/06 | 43/3 |
| 2023/0292740 | A1 * | 9/2023 | Parker | A01M 31/06 | 43/3 |
| 2023/0371497 | A1 | 11/2023 | Bradley | | |
| 2024/0114892 | A1 | 4/2024 | Bruns | | |
| 2025/0072414 | A1 | 3/2025 | Scribner | | |
| 2025/0113819 | A1 | 4/2025 | Denmon | | |
| 2025/0194839 | A1 * | 6/2025 | Freudenthal | A47G 33/08 | |

* cited by examiner

BIRD DECOY OPERATING SYSTEM

BACKGROUND

A duck decoy is a man-made object resembling a duck. Duck decoys are used in hunting to attract ducks to an area of water by giving the impression that other ducks are in the area. Decoys are made in different forms designed to mimic different activities of ducks. For example, a decoy may have spinning wings, creating the illusion of a duck in flight. Hunters may also create the illusion of natural movement by using jerk-rigs, which allow hunters to move decoys manually from a remote location, such as from inside a duck blind.

However, the illusion of natural appearance can be easily disturbed. A wild duck may spot a jerk line that is too close to the water's surface, that is overly reflective and/or that is otherwise visible to a flying duck. Furthermore, waves or ripples may form on the water where the jerk line emerges from below the water and may thus further erode the impression that other wild ducks are in the area.

This document describes methods and systems that address issues such as those discussed above and also other issues.

SUMMARY

Generally, the present disclosure describes embodiments related to systems or rigs for operating bird decoys. An apparatus for securing a jerk rig beneath a surface of a body of water includes a helical anchoring member configured to engage with the ground when rotated. The apparatus further includes a halyard support portion comprising an upstanding standard, such as an elongated rod, pole, bar, stick, etc. (collectively referred to herein as "shaft") connected to the helical anchoring member and extending upwards from the helical anchoring member, the halyard support portion supporting one or more halyard systems. (Note that as used herein, "halyard" may include a cord, rope, line, or the like.) Each of the one or more halyard systems includes a lower pulley, an upper pulley disposed further from the helical anchoring member than the lower pulley, and a halyard running between the lower pulley and the upper pulley. The halyard includes an attachment point for a jerk line, and the halyard is configured to (when operated) cause the attachment point to move between the lower pulley and the upper pulley. The apparatus may further include an arm extending outwardly from the elongated shaft and defining a handle for rotating the helical anchoring member into the area of ground.

Implementations of the disclosure may include one or more of the following optional features. In some examples, the helical anchoring member includes an auger, and at least one of the halyard systems may include an arm extending outwardly from the elongated shaft. The arm may include two arms extending outwardly in opposite directions from the elongated shaft, the two arms comprising an integrally formed cross member. The upper pulley comprises a locking element configured to (when in an unlocked configuration) permit operation of the halyard and (when in a locked configuration) inhibit operation of the halyard. The one or more halyard systems may include two halyard systems, each of the two halyard systems being disposed on an opposite side of the elongated shaft. The attachment point for the jerk line may include a barrel and/or a locking snap and/or a pulley. The apparatus may further include a strut extending outwardly from the elongated shaft defining a platform for applying downward foot pressure to the helical anchoring member to help releasably fix the elongated shaft in the ground. In some examples, the elongated shaft includes a mounting element configured to receive a decoy. Also, at least one of the upper pulley and/or lower pulley may include a stainless-steel pulley having ball bearings.

Implementations of the disclosure may also include a method of deploying a decoy system or rig, including securing an apparatus in or to the ground by an anchoring member, the apparatus including one or more halyard systems. The method further includes attaching a jerk line to an attachment point of a halyard system of the one or more halyard systems. (Note that as used herein, "jerk line" may include a cord, rope, line, or the like.) Additionally, the method includes operating the halyard system to cause the attachment point to be beneath a surface of a body of water on which the decoys float.

Implementations of the methods of the disclosure may include one or more of the following optional features. In some examples, the method may include securing the apparatus of in or to the ground includes causing the anchoring member to rotate. The method may further include affixing a decoy to the apparatus. The method may further include, when the attachment point is beneath the surface of the body of water, actuating a locking element of the halyard system to releasably restrain operation of a halyard of the halyard system.

The details of one or more aspects of the disclosure are set forth in the accompanying drawings and the description below. Other features, objects, and advantages of the methods, steps, and techniques described in this disclosure will be apparent from the description and drawings, and from the claims.

BRIEF DESCRIPTION OF THE DRAWINGS

The drawings referenced herein form a part of the specification. Features shown in the drawings are meant as illustrative of some, but not all, embodiments of the invention, unless otherwise explicitly indicated, and implications to the contrary are otherwise not to be made. Although in the drawings like reference numerals correspond to similar, though not necessarily identical, components and/or features, for the sake of brevity, reference numerals or features having a previously described function may not necessarily be described in connection with other drawings in which such components and/or features appear.

DETAILED DESCRIPTION

Figure 1:
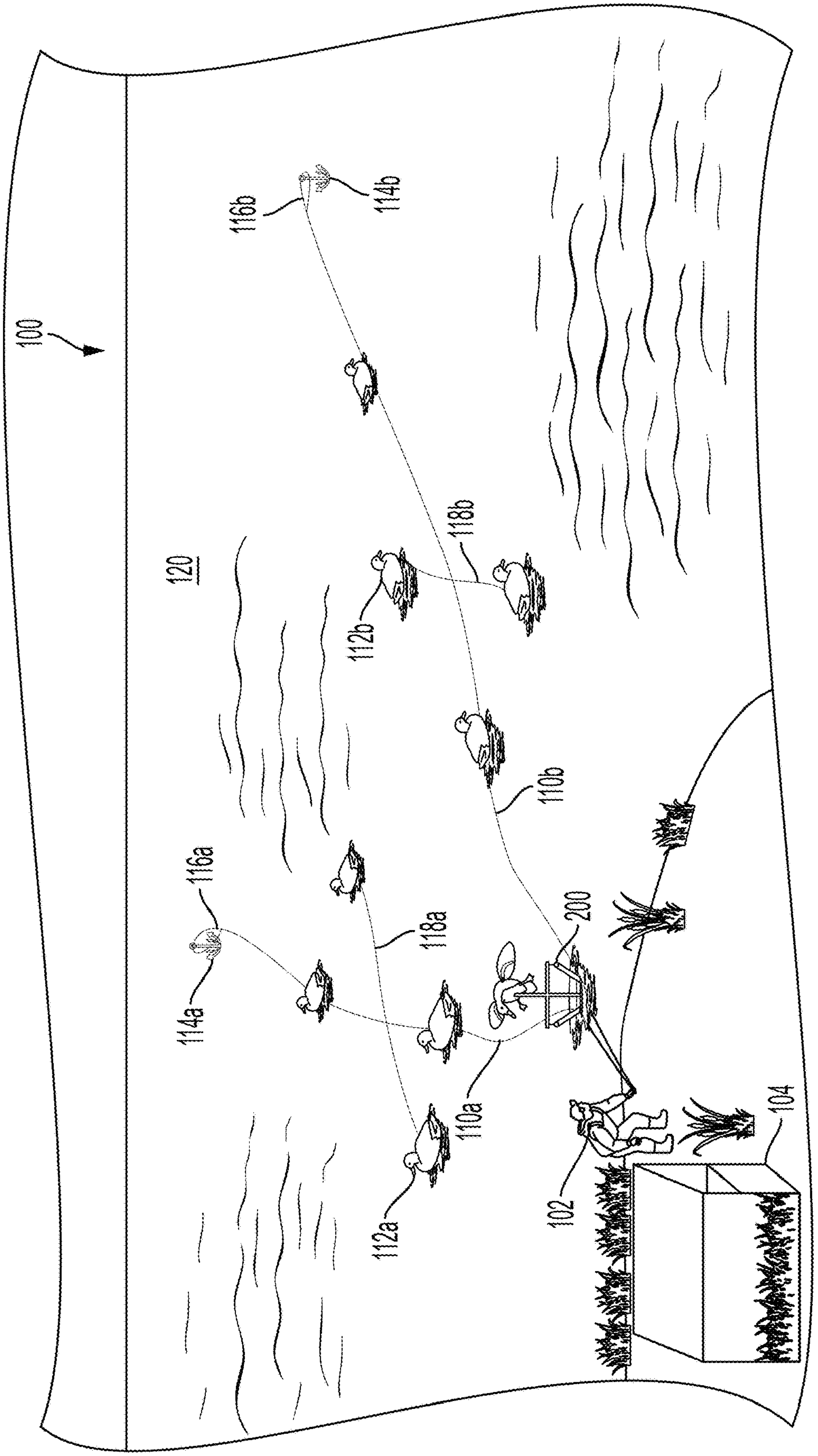
FIG. 1 is a perspective view of an example shows an example bird decoy operating system of the present disclosure situated in an operational environment for use in connection with bird or waterfowl decoy rigs.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun or phrase, such use is simply intended to distinguish one item from another and is not intended to require a sequential order unless specifically stated. The term "about" when used in connection with a numeric value, is intended to include values that are close to, but not exactly, the number. For example, in some embodiments, the term "about" may include values that are within +/−10 percent of the value.

The present disclosure relates generally to methods and systems related to rigs for operating bird decoys. In particular, the methods and systems are directed to securing a jerk rig beneath the surface of a body of water. Bird decoys are used to give the impression that other birds are in the area, e.g., by accurately mimicking the activities of wild birds. The goal is to attract wild birds to land among (or near) the decoys, where they can be hunted. Thus, the more accurately the decoys mimic natural bird appearances and behavior, the more successful the hunter is likely to be. The hunter may make the decoys appear even more life-like by imparting motion to the decoys. The motion may be imparted remotely, e.g., using a line that is run from the decoy(s) to a remote location, such as a duck blind. The decoys may also be tethered to an elastic cord, so that by alternatingly pulling, tugging, or "jerking" in an impulse manner, on and releasing the "jerk line," the hunter may cause the decoys to move back and forth, emulating paddling ducks. This configuration may be called a jerk rig due to the alternating tugging and releasing of the rig. Note that such configuration could also be used for purposes other than hunting, including for example, for photographing wildlife other that waterfowl, game management, or for other surveillance purposes, etc.

However, the jerk rig itself may provide clues to the wild birds of something unnatural. For example, when decoys are floating on the surface of a body of water, the line(s) that connect the decoy(s) may be visible to a flying bird. Furthermore, jerking action of the rig may cause a line to create unnatural disturbances to the water's surface near where the line exits the water. By securing the line(s) of the jerk rig beneath the surface of a body of water (at least in the vicinity of the decoys) the impression of natural bird behavior may be better maintained.

FIG. 1 shows an example environment 100 for deploying and operating one or more bird decoy rigs 110*a*, 110*b*. The environment includes a body of water 120 such as a natural or man-made pond or stream. The body of water 120 may include portions that are shallow enough for a hunter 102 to wade into in order to configure and deploy the one or more bird decoy rigs 110*a*, 110*b*. The environment 100 may also include a blind 104, i.e., a concealment device, shelter, or similar structure from which the hunter can operate the jerk rigs 110*a*, 110*b*. The blind may allow the hunter to operate the rigs 110*a*, 110*b* while remaining concealed from wild birds (e.g., ducks or other water fowl, etc.). As shown, a hunter 102 has deployed two duck decoy rigs 110*a*, 110*b*. The distal end of each rig 110*a*, 110*b* is secured to the ground/bottom (124, FIG. 2) of the body of water 120 by, e.g., an anchor 114*a*, 114*b*. The anchor may be a grappling/folding anchor, mushroom anchor of a suitable weight (e.g., five or so pounds), or a suitably heavy weight, such as a cinder block or a bag of dirt or sand capable of securing the end of the rig 110*a*, 110*b*. In some examples, the anchor 114*a*, 114*b* is attached to an elastic portion 116*a*, 116*b* of the jerk rig. The elastic portion 116*a*, 116*b* may be a length of bungee cord, or a loop of elastic cord or the like. The remainder of the jerk line may be monofilament fishing line (e.g., 400 lb. breaking-strength), durable nylon line, ultra-high molecular polyethylene line, or other substantially non-elastic material, allowing the effective transmission of forces applied by the hunter to cause desired motion of the decoys 112. In some examples, the jerk line is non-reflective or otherwise difficult for a bird to perceive. For example, the jerk line may be transparent (as in monofilament line) or may be colored to match the body of water 120 as seen from above.

Each decoy (jerk) rig 110*a*, 110*b* may also include a number of decoys 112*a*, 112*b* attached to the jerk line. In some examples, the jerk line includes loops knotted at intervals for attaching the decoys 112*a*, 112*b*. In other examples, the decoys 112*a*, 112*b* are attached to the jerk line using snap swivels or other quick-release devices. In some examples, to avoid having all the decoys 112*a*, 112*b* arranged in a single line, groups of decoys 112*a*, 112*b* are attached to a spreader system 118*a*, 118*b* or similar device (e.g., dredge bar/umbrella rig) which spaces the decoys 112*a*, 112*b* apart from each other. During operation of the jerk line(s) 110*a*, 110*b*, the jerk line(s) 110*a*, 110*b* is/are kept underwater by apparatus 200, at least between the anchor(s) 114*a*, 114*b* and the apparatus 200. That is, the jerk line(s) 110*a*, 110*b* only emerge from the body of water 120 between the apparatus 200 and the water's edge, e.g., near the blind 104. Therefore, any disturbance to the surface of the body of water caused by the emerging jerk line(s) 110*a*, 110*b* occurs at a distance from the deployed decoys 112. As described in more detail below, the apparatus 200 secures the jerk line(s) 110*a*, 110*b* beneath the surface of the body of water 120 while also providing for smooth operation of the jerk line(s) 110*a*, 110*b*.

The hunter 102 will typically deploy the apparatus 200 upwind of the deployed decoys 112 and arrange the decoys to be facing into the wind. Using two jerk rigs, spaced apart from each other (as shown in FIG. 1), this arrangement leaves a "hole" or a space between the two jerk rigs to entice passing birds to land in. Because birds generally land into the wind, an additional decoy may be deployed on or near the apparatus 200 that simulates the appearance of a landing bird. This decoy arrangement, as a whole, may be particularly alluring to passing birds. However, other configurations are also possible using the disclosed apparatus 200. Therefore, these other configurations are also within the scope of this disclosure.

Figure 2:
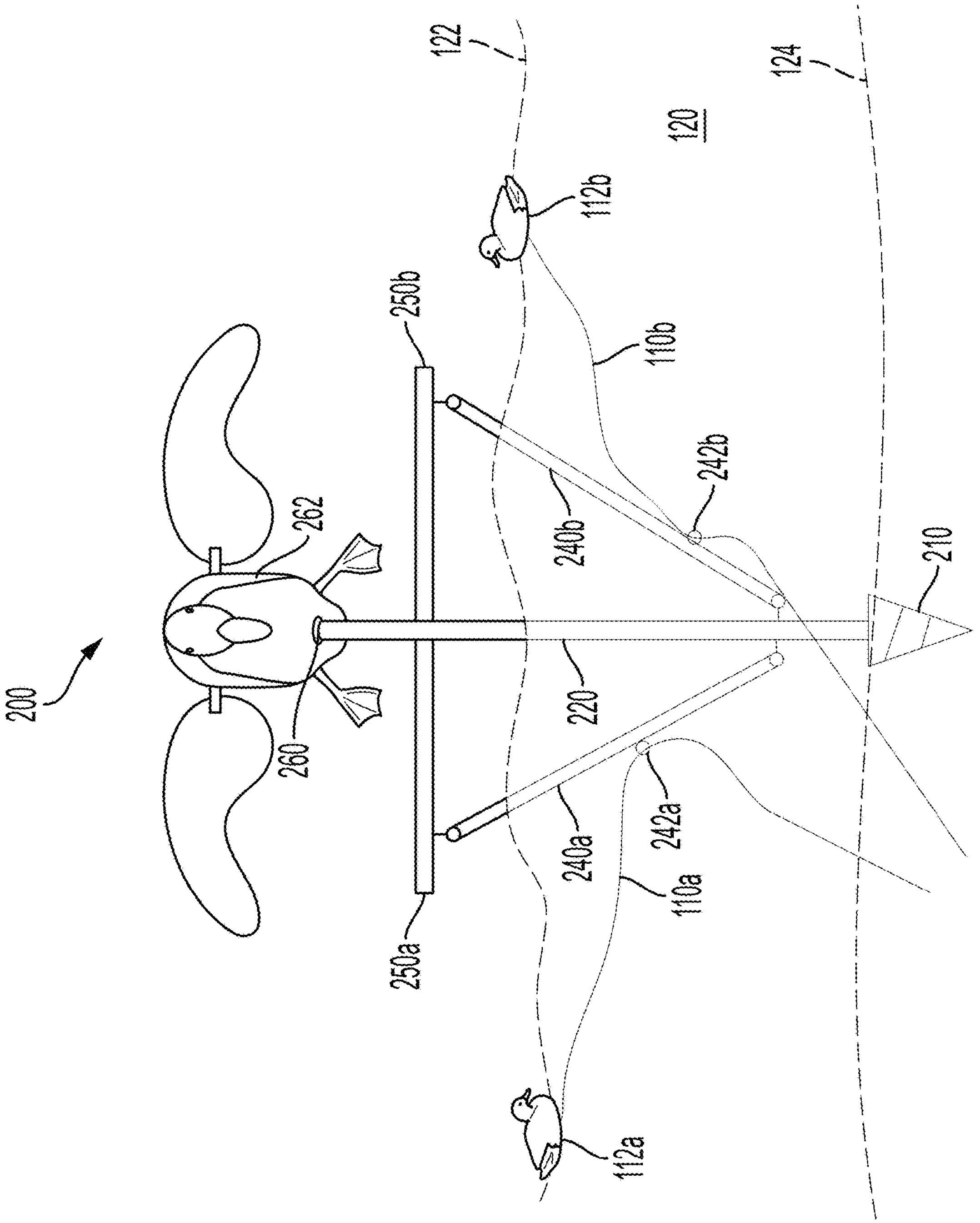
FIG. 2 is front elevational view of an example bird decoy operating system of the present disclosure.

FIG. 2 shows an example apparatus 200 for securing a jerk rig beneath a surface 122 of a body of water 120. The apparatus 200 includes an anchoring member 210 configured to secure the apparatus 200 to the ground 124 beneath the body of water 120. In some examples, the anchoring member 210 is an auger or other helical bit-like structure for boring a hole in the ground 124 and engaging with the ground 124 to secure the apparatus 200. In some examples, the anchoring member 210 is removably attachable to the apparatus 200. That is, a user (such as hunter 102) may remove the anchoring member 210, e.g., during storage and/or transportation of the apparatus 200. By removing the anchoring member 210, the user may make the apparatus 200 more compact and/or easier to handle, pack and unpack, and transport. Furthermore, because the user bores the anchoring member 210 into the ground 124, it is the most likely portion of the apparatus 200 to become muddy or dirty. Removing the anchoring member 210 allows the user to store the anchoring member 210 in an area that is suitable for dirty/muddy components, while storing the remainder of the apparatus 200 in a cleaner area.

The anchoring member 210 may have characteristics that make it most suitable for specific ground conditions. That is, the pitch of an auger (e.g., the distance between adjacent blades), the width of the blades, and the total number of blades may all contribute to make the auger most suitable for very soft soil or much firmer ground 124. To accommodate a wide variety of ground conditions, the apparatus 200 may include a variety of interchangeable anchoring members 210, each anchoring member 210 being suitable for a different type of ground 124.

Extending (e.g., vertically upward) from, and connected to, the anchoring member 210 is shaft 220 configured to support one or more halyard systems, e.g., 240*a*, 240*b* (described in more detail below). The elongated shaft 220 may have a circular, square, and/or other cross section. For example, the elongated shaft 220 may have a square cross section near the anchoring member 210 and a circular cross section further away from the anchoring member 210. Furthermore, the elongated shaft 220 may taper or diminish in cross section as it extends further from the anchoring member 210. In some examples, the elongated shaft 220 tapers to a point at a distal end. The elongated shaft 220 may include one or more arms, e.g., 250*a*, 250*b*, extending outwardly (e.g., horizontally) from the elongated shaft 220 to allow one or more halyard systems 240 to be spaced apart from the elongated shaft 220. Furthermore, the hunter 102 (or other user) may apply force to the arm(s) to drive the anchoring member 210 into the ground 124. That is, the hunter 102 may use the arm(s) to rotate the apparatus 200, causing the anchoring member to bore in the ground 124 and to secure the apparatus 200 to the ground 124. In some examples, the apparatus 200 includes a dedicated arm for operating the anchoring member 210. The dedicated arm may include a portion constructed of (or covered by) PVC or other material that is comfortable to push against while anchoring the apparatus 200. In some examples, a cross member forms (e.g., as shown in FIG. 2), two arms 250 that extend outwardly in opposite directions from the elongated shaft 220. In some examples, one or more of the arms 250 is removable. The removable arm 250 may be attached and retained in position using a threaded attachment system, spring pins that mate with holes, or other system that allows the arm 250 to be securely attached and removed by hand (i.e., without requiring specialized tools).

In some examples, one or more arms 250 may be configured to fold into a more compact configuration, e.g., to be parallel to and abutting the elongated shaft 220. That is, at least one arm may include a hinging mechanism (not shown) that allows the arm 250 to be configurable between a first position (extending away from the elongated shaft 220) and a second position (e.g., lying along the elongated shaft 220). The latter configuration may facilitate storing and/or transporting the apparatus 200. Foldable arms 250 may be configurable between the first position and second positions without requiring specialized tools and may include mechanisms to secure the arm 250 in either position, such as a (e.g., spring-loaded) pin that mates with a hole. Furthermore, the apparatus 200 may be usable as a mooring device, which could be facilitated, if desired, by both arms 250 being folded down against the elongated shaft 220. The apparatus 200 may include a clip or loop or other feature for attaching a boat to the apparatus 200. The hunter may use the boat as a platform for deploying the lines 110, decoys 112, and/or other equipment before the hunt and to recover the equipment after the hunt.

In some examples, the elongated shaft 220 includes a mounting element 260 configured to receive a decoy 262. As shown, the decoy 262 is mounted on top of the elongated shaft 220 and above the surface 122 of the body of water 120. In this position, the decoy 262 may emulate a flying bird, rather than a floating, paddling, or swimming bird. More specifically, the shaft-mounted decoy 262 may emulate a bird that is in the process of landing in the body of water 120. As shown, the decoy 262 includes wings that spin to emulate the motion of a landing bird. In other embodiments, the decoy 262 may include flapping wings, e.g., electrically powered and/or powered by the air currents. The hunter 102 may position the decoy 262 to face into the wind to further emulate the behavior of a bird in the process of landing. While FIG. 2 illustrates the decoy 262 mounted above the elongated shaft 220, in other embodiments, the decoy 262 may be mounted in front of (e.g., upwind) or to the side of the elongated shaft 220. In some examples, the decoy 262 is secured to the elongated shaft 220 by an elastic cord or other means. For example, the mounting element 260 may include one or more protrusions extending away from the elongated shaft 220, around which a loop of cord, such as elastic cord, attached to the decoy 262 may be fastened.

The mounting element 260 may also be used for ancillary purposes. For example, when there is no decoy 262 mounted, the mounting element 260 may serve as a useful holder for carabiners or other tackle. For example, at the end of a session, as the hunter 102 retrieves the jerk lines 110, the hunter 102 may stow the jerk lines 110 and/or ancillary tackle by hanging the tackle from the mounting element 260. The mounting element 260 could also be used as a makeshift hat rack and/or include a detachable shelf (not shown) to use as a place to stow drinks, a phone, sunglasses, etc.

Figure 3:
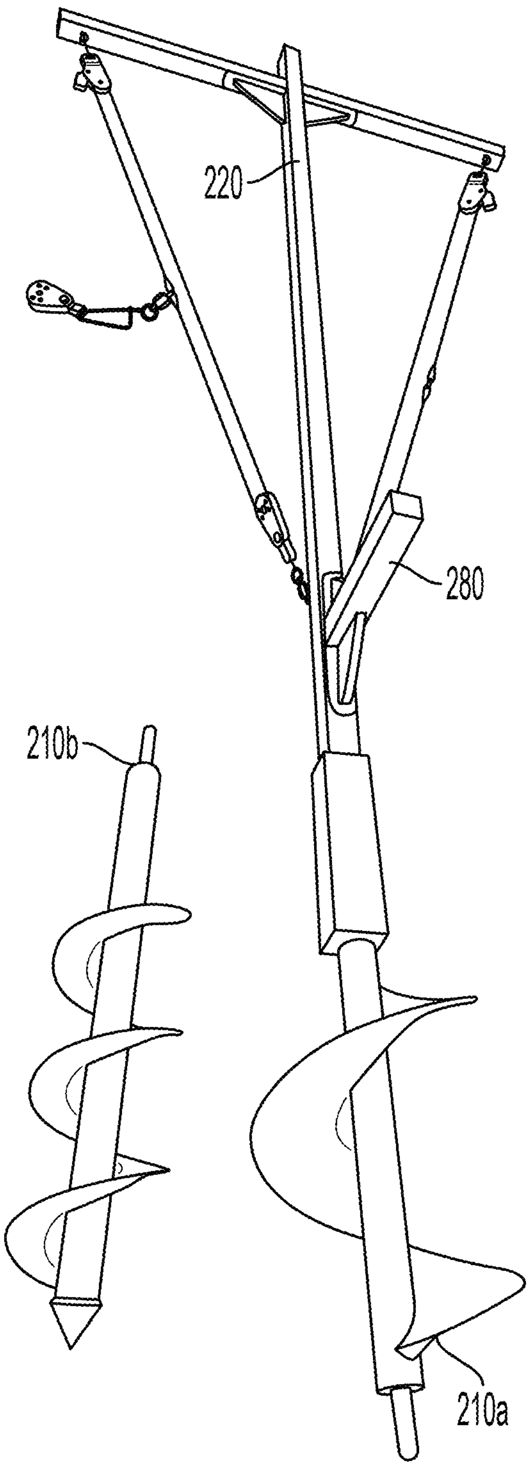
FIG. 3 is perspective view of an example bird decoy operating system of the present disclosure.

FIG. 3 shows another view of the example apparatus 200, including two interchangeable anchoring members 210*a*, 210*b*. FIG. 3 also shows an optional strut 280 extending outwardly from the elongated shaft 220. The strut defines a platform for the hunter 102 (or other user) to apply downward foot pressure to the anchoring members 210 at the bottom of the elongated shaft 220. That is, the hunter 102 may use one of his feet to press downward on the strut 280 to initiate the process of engaging the anchoring member 210 with the ground 124. After the anchoring member 210 is partially engaged, the hunter may then begin rotating the apparatus 200 to further bore the anchoring member 210 into the ground 124. If necessary, the hunter 102 may continue to apply pressure using the strut 280 while rotating the apparatus 200, e.g., to bore into particularly firm ground 124. In some examples, the apparatus 200 may include a brace between the elongated shaft 220 and the strut 280, allowing for relatively large forces to be applied to the strut 280 (e.g., up to and including the weight of the hunter 102).

The apparatus 200 may be between approximately two and five feet from the base of the elongated shaft 220 to the cross arms (e.g., 250*a*, 250*b*). Because typical waders extend only up to the hips, waist, or chest, the hunter 102 is unlikely to deploy the apparatus 200 in water that is more than a few feet deep. For convenient access to the halyard system 240, the uppermost portion of the halyard system 240 should remain exposed, i.e., above the surface 122 of the body of water, after the apparatus 200 is secured to the ground 124. Therefore, in most situations, there is no need for the apparatus 200 to be taller than about five feet.

In some examples, one or more of the arms 250 (or other structural elements) may be telescoping and/or foldable, e.g., to facilitate transportation. For example, referring to FIG. 2, arms 250*a* and 250*b* may include multiple nesting elements that are configured to slide with respect to each other to achieve a desired length. Once configured, the nesting elements may be secured in place, e.g., with spring-loaded pins (not shown) that selectively engage with holes that are provided for that purpose. Alternatively, the telescoping elements may be secured using a twist-lock mechanism (not shown).

The apparatus 200 may be treated to make it non-reflective and, thus, less visible and/or less likely to appear unnatural to passing birds. In some examples, apparatus 200 is powder-coated to provide a durable long-lasting finish that may also be non-reflective. However, the apparatus 200 may simply be painted or even left unfinished. In some examples, the apparatus 200 is equipped with an accessory float to assist locating the apparatus 200, e.g., if it is accidentally dropped. That is, a highly visible (e.g., brightly colored) buoyant device (not shown) may be permanently tethered to the apparatus 200 by a leash, so that if the apparatus 200 is submerged (e.g., accidentally dropped over the side of a boat), the float will indicate the position of the apparatus 200, and the leash (not shown) will provide a means to recover the apparatus 200. In some examples, the leash is normally stowed in coils, e.g., retained by an elastic band or similar system that will allow the leash to "play out" due to the buoyant force of the float.

The embodiment shown in FIGS. 2 and 3 include two halyard systems 240*a*, 240*b* each of which is associated with one jerk line 110*a*, 110*b*. However, in some examples, the apparatus 200 can be configured, if desired, to support a larger or smaller number of halyard systems 240 (and associated jerk lines 110). As shown, each jerk line 110*a*, 110*b* passes through an attachment point 242*a*, 242*b* of its associated halyard system 240*a*, 240*b*. In some examples, a halyard system 240 includes several attachment points 242, e.g., at different heights, so that a single halyard system may support multiple jerk lines 110. As shown, the halyard systems 240*a*, 240*b* are supported by the elongated shaft 220 and the arms 250*a*, 250*b*. Thus, the shaft 220 and the arms 250*a*, 250*b* form a halyard support system for the two halyard systems 240*a*, 240*b*.

Figure 4:
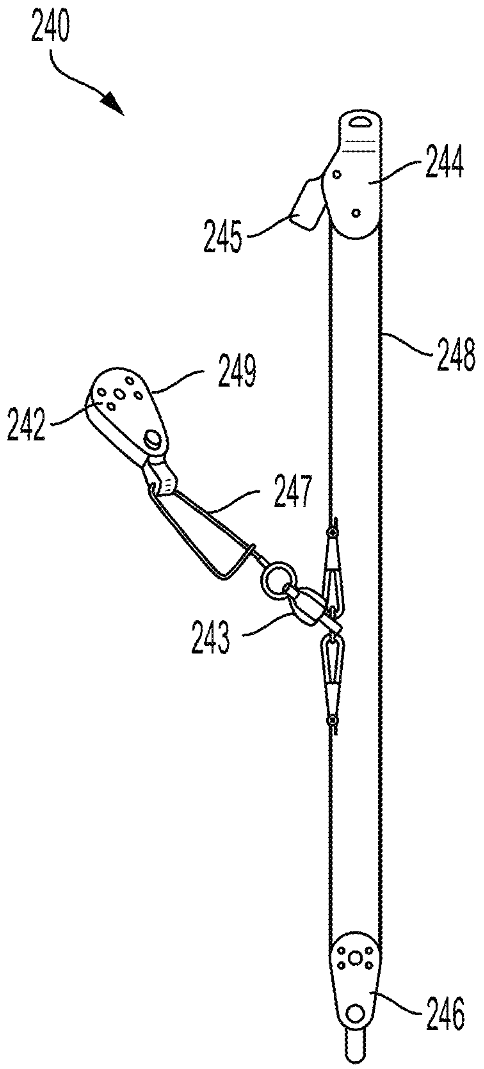
FIG. 4 is perspective view of components of an example bird decoy operating system of the present disclosure.

FIG. 4 shows details of example halyard system 240 components of apparatus 200. The example halyard system includes an upper pulley 244, a lower pulley 246, a halyard 248 running between the upper pulley 244 and the lower pulley 246, and a jerk-line attachment point 242 connected to the halyard 248. As shown, the jerk-line attachment point 242 may include a barrel 243 and/or a locking snap 247 and/or a pulley 249. In some examples, the upper pulley 244 and the lower pulley 246 are each attached to the halyard support system. During normal operation, the upper pulley 244 is expected to be above the surface 122 of the body of water, and the lower pulley 246 (and the attachment point 242) are expected to be below the surface 122 of the body of water. Therefore, the attachment point, and especially the lower pulley 246, may be configured to withstand prolonged submerged operation. For example, the lower pulley may be constructed of stainless steel to avoid corrosion and may include ball bearings to reduce friction and facilitate smooth operation.

The halyard 248 may be a natural or synthetic cord or a synthetic monofilament fiber. The halyard 248 will typically have a sufficiently large diameter to allow for easy manipulation. In one example, the halyard may be a 2 mm diameter monofilament fishing line. The upper pulley 244 may also be constructed of stainless steel and may also include ball bearings. However, the upper pulley 244 is expected to typically remain above the surface 122 of the body of water 120 and, therefore, is not required to endure sustained submerged operation. Therefore, other constructions may also be appropriate. As shown, the upper pulley 244 includes a locking element 245 that is configured to inhibit rotation of the pulley and, thus, inhibit motion of the halyard 248. In some examples, the locking element 245 includes a cam lock that applies pressure to the halyard 248. In other examples, the locking element 245 applies force to the pulley itself (rather than the halyard 248) to inhibit motion of the pulley. Other mechanisms for inhibiting motion of at least one pulley are also within the scope of this disclosure.

Figure 5:
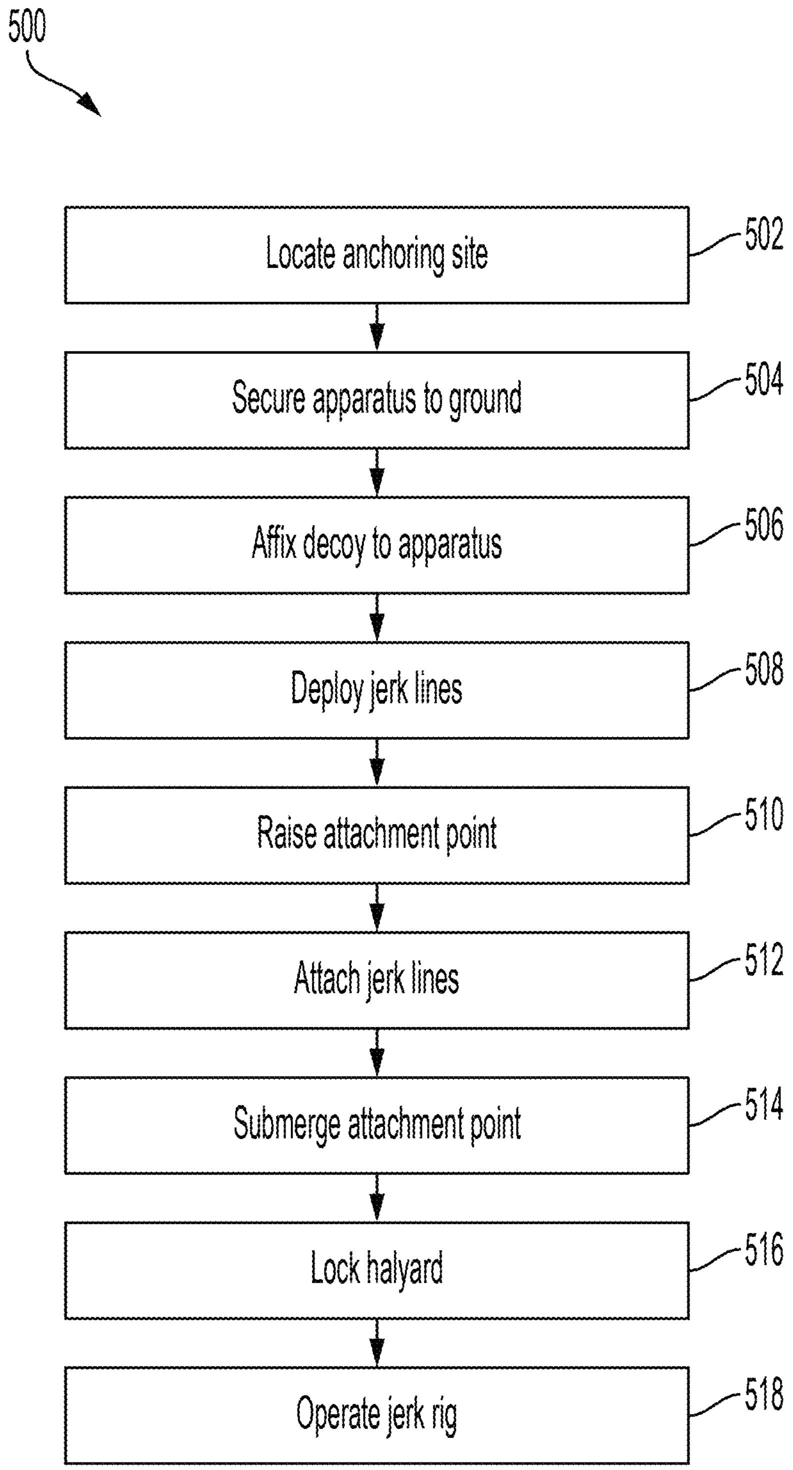
FIG. 5 is a flowchart of an example method of the present disclosure.

FIG. 5 shows a flowchart 500 of an example method of deploying a decoy rig. As described above, the location of the apparatus 200 may define the upwind most point of the decoy system. That is, the jerk lines 110 (and associated decoys) may extend downwind from the apparatus 200. At step 502 of the example method, the hunter first locates an appropriate site to anchor the apparatus 200. The step 502 may include wading into the body of water 120 to reach the anchoring site. At step 504, at the anchoring site, the hunter 102 may secure the apparatus 200 to the ground 124 using the anchoring member. As described above, if the apparatus is equipped with a strut 280, the hunter 102 may place one foot on the strut 280 to apply downward pressure while rotating the apparatus 200 (e.g., using one or more arms 250).

At step 506, after the apparatus 200 is secured to the ground 124, the hunter 102 may optionally affix a decoy 262, such as a spinning-wing decoy 262 to the mounting element 260 (and, optionally, secure the decoy 262 with elastic cord). At step 508, the hunter 102 may then deploy one or more jerk lines 110, starting at a distal end (e.g., where an anchor may be located) and finishing back at the apparatus 200. At step 510, if necessary, once back at the apparatus 200, the hunter 102 may operate each halyard system 240 until the attachment point 242 is above the surface 122 of the body of water 120. That is, the hunter 102 may manipulate (e.g., push and/or pull) the halyard 248, causing the attachment point 242 to move upward, until the attachment point 242 is above the surface 122 of the body of water 120. At step 512, the hunter 102 may then attach the jerk line 110 to the attachment point 242. For example, if the attachment point 242 is a clasp or snap, the hunter 102 may open the clasp, place the jerk line within the clasp, then close the clasp. At step 514, after attaching the jerk line 110, the hunter 102 may manipulate the halyard 248, causing the attachment point 242 to move downward, submerging the jerk line 110.

At step 516, if the upper pulley 244 is equipped with a locking element 245, the hunter 102 may engage the locking element 245 to inhibit the attachment point 242 from moving up or down. After the hunter has attached all the jerk lines 110, the hunter 102 may return to the blind 104, with the proximal, or free, ends of the attached jerk lines 110. At step 518, once at the blind 104, the hunter 102 may operate the jerk lines 110, causing the decoys 112 to move back and forth.

While the invention has been described with specific embodiments, other alternatives, modifications and variations will be apparent to those skilled in the art. Accordingly, it will be intended to include all such alternatives, modifications, and variations within the spirit and scope of the appended claims.

The invention claimed is:

1. An apparatus for securing a jerk rig beneath a surface of a body of water, the apparatus comprising:
   - a helical anchoring member configured to engage with an area of ground when rotated;
   - a halyard support portion comprising an elongated shaft connected to the helical anchoring member and extending upwards from the helical anchoring member, the halyard support portion being configured for supporting one or more halyard systems, each of the one or more halyard systems comprising:
     - a lower pulley,
     - an upper pulley disposed further from the helical anchoring member than the lower pulley, and
     - a halyard running between the lower pulley and the upper pulley, wherein:
       - the halyard comprises an attachment point for a jerk line, the attachment point configured to be submerged beneath the surface of the body of water;
       - the halyard is configured to, when operated, cause the attachment point to move between the lower pulley and the upper pulley; and
       - the upper pulley and/or the lower pulley comprises a locking element configured to:
         - when in an unlocked configuration, permit operation of the halyard; and
         - when in a locked configuration, inhibit operation of the halyard without inhibiting operation of the jerk line; and
   - at least one arm extending outwardly from the elongated shaft and defining a handle for rotating the helical anchoring member into the area of ground.

2. The apparatus of claim 1, wherein the helical anchoring member comprises an auger.

3. The apparatus of claim 1, wherein at least one of the one or more halyard systems comprises the at least one arm extending outwardly from the elongated shaft.

4. The apparatus of claim 1, wherein the at least one arm comprises two arms extending outwardly in opposite directions from the elongated shaft, the two arms comprising an integrally formed cross member.

5. The apparatus of claim 1, wherein the one or more halyard systems comprises two halyard systems, each of the two halyard systems disposed on an opposite side of the elongated shaft.

6. The apparatus of claim 1, wherein the attachment point for the jerk line comprises a barrel and/or a locking snap and/or a pulley.

7. The apparatus of claim 1, further comprising a strut extending outwardly from the elongated shaft defining a platform for applying downward foot pressure to the helical anchoring member.

8. The apparatus of claim 1, wherein the elongated shaft comprises a mounting element configured to receive a decoy.

9. The apparatus of claim 1, wherein at least one of the upper pulley and/or lower pulley comprises a stainless-steel pulley having ball bearings.

10. The apparatus of claim 1, wherein the upper pulley comprises the locking element.

11. A method of deploying a decoy rig on a body of water, the method comprising:
   - securing an apparatus having an anchoring member to the ground using the anchoring member, the apparatus comprising a halyard system, the halyard system comprising:
     - an upper pulley;
     - a lower pulley,
     - a locking element, and
     - a halyard running between the lower pulley and the upper pulley, the halyard comprising an attachment point, wherein the halyard system is configured to, when operated, cause the attachment point to move between the upper pulley and the lower pulley;
   - passing a jerk line through the attachment point of the halyard system, such that the jerk line is operable to cause one or more decoys to move back and forth;
   - operating the halyard system to cause the attachment point to be beneath a surface of the body of water;
   - while the attachment point is beneath the surface of the body of water, actuating the locking element of the halyard system while the locking element is above the surface of the water to releasably restrain operation of the halyard system; and
   - while the locking element is actuated, operating the jerk line.

12. The method of claim 11, wherein securing the apparatus to the ground comprises causing the anchoring member to rotate.

13. The method of claim 11, wherein securing the apparatus to the ground comprises applying a downward pressure to a strut of the apparatus.

14. The method of claim 11, further comprising:
   - affixing a decoy to the apparatus.

15. The method of claim 11, wherein actuating the locking element of the halyard system comprises actuating the locking element of an upper pulley of the halyard system.

16. An apparatus for securing a jerk rig beneath a surface of a body of water, the apparatus comprising:
   - a halyard support portion comprising an elongated shaft extending upwards from an anchoring member, the halyard support portion configured to support one or more halyard systems, each of the one or more halyard systems comprising:
     - a lower pulley,
     - an upper pulley disposed further from the anchoring member than the lower pulley, and
     - a halyard running between the lower pulley and the upper pulley, wherein:
       - the halyard comprises an attachment point for a jerk line, the attachment point configured to be submerged beneath the surface of the body of water;
       - the halyard is configured to, when operated, cause the attachment point to move between the lower pulley and the upper pulley; and
       - the upper pulley and/or the lower pulley comprises a locking element configured to:
         - when in an unlocked configuration, permit operation of the halyard; and
         - when in a locked configuration, inhibit operation of the halyard without inhibiting operation of the jerk line.

17. The apparatus of claim 16, wherein the one or more halyard systems comprises two halyard systems, each of the two halyard systems disposed on an opposite side of the elongated shaft.

18. The apparatus of claim 16, wherein the attachment point for the jerk line comprises a barrel and/or a locking snap and/or a pulley.

19. The apparatus of claim 16, wherein the elongated shaft comprises a mounting element configured to receive a decoy.

* * * * *